United States Patent
Di Iorio et al.

(10) Patent No.: US 11,888,183 B2
(45) Date of Patent: Jan. 30, 2024

(54) ELECTROLYSIS OR CO-ELECTROLYSIS REACTOR (SOEC) OR FUEL CELL (SOFC) WITH ELECTROCHEMICAL CELL STACKING BY PREASSEMBLED MODULES, AND ASSOCIATED PRODUCTION PROCESS

(71) Applicant: COMMISSARIAT A L'ENERGIE ATOMIQUE ET AUX ENERGIES ALTERNATIVES, Paris (FR)

(72) Inventors: Stéphane Di Iorio, Grenoble (FR); Thibault Monnet, Grenoble (FR); Bruno Oresic, Grenoble (FR); Philippe Szynal, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 17/399,782

(22) Filed: Aug. 11, 2021

(65) Prior Publication Data
US 2022/0052353 A1    Feb. 17, 2022

(30) Foreign Application Priority Data

Aug. 11, 2020 (FR) ...................... 20 08424

(51) Int. Cl.
*H01M 8/0217* (2016.01)
*H01M 8/0282* (2016.01)
(Continued)

(52) U.S. Cl.
CPC ........... *H01M 8/0217* (2013.01); *C25B 1/042* (2021.01); *C25B 9/19* (2021.01); *C25B 9/65* (2021.01);
(Continued)

(58) Field of Classification Search
CPC ............ H01M 8/0217; H01M 8/1231; H01M 8/0282; H01M 8/2425; H01M 8/248;
(Continued)

(56) References Cited

U.S. PATENT DOCUMENTS

| 2003/0082429 A1* | 5/2003 | Nishimura .......... H01M 8/0247 |
| | | 429/492 |
| 2003/0134174 A1 | 7/2003 | Akikusa et al. |

(Continued)

FOREIGN PATENT DOCUMENTS

| CN | 102694191 A | 9/2012 |
| EP | 2870650 A1 | 5/2015 |

(Continued)

OTHER PUBLICATIONS

French Preliminary Search Report dated Apr. 30, 2021 in French Application 20 08424 filed on Aug. 11, 2020 (with English Translation of Categories of Cited Documents), 3 pages.

(Continued)

*Primary Examiner* — Brian R Ohara
(74) *Attorney, Agent, or Firm* — Oblon, McClelland, Maier & Neustadt, L.L.P.

(57) ABSTRACT

An electrochemical device may be formed by assembly by stacking preassembled modules, each of these modules being produced as a usual stack of electrochemical cells. The manufacture of preassembled modules can make it possible to produce electrochemical devices with a large number of electrochemical cells, without the bracing problems present and excessive crushing courses that are encountered in the cell stacks according to the prior art, i.e., in a single block.

15 Claims, 4 Drawing Sheets

(51) Int. Cl.
　　 *H01M 8/1231* (2016.01)
　　 *H01M 8/2425* (2016.01)
　　 *H01M 8/248* (2016.01)
　　 *H01M 8/12* (2016.01)
　　 *C25B 1/042* (2021.01)
　　 *C25B 9/19* (2021.01)
　　 *C25B 9/65* (2021.01)
　　 *C25B 9/77* (2021.01)
　　 *C25B 13/07* (2021.01)

(52) U.S. Cl.
　　 CPC ............... *C25B 9/77* (2021.01); *C25B 13/07* (2021.01); *H01M 8/0282* (2013.01); *H01M 8/1231* (2016.02); *H01M 8/248* (2013.01); *H01M 8/2425* (2013.01); *H01M 2008/1293* (2013.01)

(58) Field of Classification Search
　　 CPC .. H01M 2008/1293; C25B 1/042; C25B 9/77; C25B 13/07; C25B 9/19; C25B 9/65
　　 See application file for complete search history.

(56) References Cited

U.S. PATENT DOCUMENTS

| 2004/0115518 | A1* | 6/2004 | Masel | ............... | H01M 4/96 |
| | | | | | 429/492 |
| 2007/0037031 | A1* | 2/2007 | Cassidy | ............ | C22C 29/005 |
| | | | | | 264/618 |
| 2009/0130522 | A1 | 5/2009 | Akikusa et al. | | |
| 2015/0194693 | A1 | 7/2015 | Di Iorio et al. | | |
| 2016/0285113 | A1* | 9/2016 | Di Iorio | ............... | C25B 9/73 |
| 2016/0336605 | A1* | 11/2016 | Tanimura | ............ | H01M 8/0273 |
| 2020/0083545 | A1* | 3/2020 | Sato | ............... | C25B 9/73 |
| 2020/0251763 | A1 | 8/2020 | Friedrich et al. | | |

FOREIGN PATENT DOCUMENTS

| EP | 2900846 A1 | 8/2015 |
| EP | 3078071 A1 | 10/2016 |
| JP | 2000-340249 A | 12/2000 |
| JP | 2016-520976 A | 7/2016 |
| WO | WO2014/006298 A1 | 1/2014 |
| WO | WO2014/049523 A1 | 4/2014 |
| WO | WO2015/083076 A1 | 6/2015 |

OTHER PUBLICATIONS

Office Action dated Oct. 3, 2022, in corresponding Japanese Patent Application No. 2021-130664 (with English Translation), 10 pages.
Office Action dated Jun. 26, 2023, in corresponding Japanese Patent Application No. 2021-130664 (with English Translation), 14 pages

* cited by examiner

ELECTROLYSIS OR CO-ELECTROLYSIS REACTOR (SOEC) OR FUEL CELL (SOFC) WITH ELECTROCHEMICAL CELL STACKING BY PREASSEMBLED MODULES, AND ASSOCIATED PRODUCTION PROCESS

CROSS-REFERENCE TO RELATED APPLICATIONS

The present application claims the benefit of the filing date of French Appl. No. 2008424, filed on Aug. 11, 2020, the content of which is incorporated by reference.

TECHNICAL FIELD

The present invention relates to the field of solid oxide fuel cells (SOFC), to the field of high-temperature water electrolysis (HTE, high-temperature electrolysis, or HTSE, high-temperature steam electrolysis) and also to solid oxide electrolyser cells (SOEC), and to the field of the high-temperature co-electrolysis of water and of another gas chosen from carbon dioxide $CO_2$ and nitrogen dioxide $NO_2$.

The invention relates more particularly to the production of an electrochemical device constituting a reactor for the high-temperature electrolysis or co-electrolysis of water (HTE) of SOEC type, or of a fuel cell of SOFC type, with stacking of elementary electrochemical cells.

The present invention is directed firstly towards improving the assembly of such a device and also its functioning.

Although described mainly with reference to the application of high-temperature water electrolysis, the invention applies equally to a co-electrolysis of water and of another gas chosen from carbon dioxide $CO_2$, and to an SOFC fuel cell.

The invention applies to an SOFC fuel cell using as combustible either hydrogen or a hydrocarbon, for example methane $CH_4$.

PRIOR ART

An SOFC fuel cell or an HTE electrolyser is an electrochemical device consisting of a stack of elementary units each including a solid oxide electrochemical cell, consisting of three anode/electrolyte/cathode layers superposed on each other, and of interconnecting plates made of metal alloys also known as bipolar plates, or interconnectors. The function of the interconnectors is to ensure both the passage of the electrical current and the circulation of the gases in the vicinity of each cell (injected steam, hydrogen and oxygen produced in an HTE electrolyser; injected air and hydrogen and water produced in an SOFC cell) and to separate the anode and cathode compartments which are the compartments for circulation of the gases on the side, respectively, of the anodes and cathodes of the cells.

To perform the high-temperature electrolysis of steam, HTE, typically between 600 and 950° C., $H_2O$ steam is injected into the cathode compartment. Under the effect of the current applied to the cell, dissociation of the water molecules in vapour form takes place at the interface between the hydrogen electrode (cathode) and the electrolyte: this dissociation produces dihydrogen gas $H_2$ and oxygen ions. The dihydrogen is collected and removed at the outlet of the hydrogen compartment. The oxygen ions O2− migrate through the electrolyte and recombine as dioxygen at the interface between the electrolyte and the oxygen electrode (anode).

To ensure the functioning of an SOFC fuel cell, air (oxygen) is injected into the cathode compartment and hydrogen is injected into the anode compartment. The hydrogen $H_2$ becomes transformed into H+ ions and releases electrons which are captured by the anode. The H+ ions arrive at the cathode where they combine with the O2− ions made from the atmospheric oxygen, to form water. Transfer of the H+ ions and of the electrons to the cathode produces a direct electrical current from the hydrogen.

To increase the flow rates of hydrogen and oxygen produced in the case of HTE electrolysis or to increase the electrical power provided in the case of an SOFC fuel cell, it is known practice to stack several elementary electrochemical cells on top of each other, separating them with the interconnectors. The assembly is positioned between two end connection plates which support the power supplies and the gas feeds/collection of an electrolyser (electrolysis reactor) or of an SOFC fuel cell.

Moreover, to improve the quality of the electrical contacts established between the interconnectors and the electrodes, and thus the performance of the abovementioned electrochemical devices, electrical contact members are individually intercalated and arranged on the electrodes. In an electrochemical device, a nickel grid is conventionally used for the contact with the hydrogen electrode (cathode in an HTE reactor, anode in an SOFC cell), since it gives satisfactory results at low cost.

In general, at the present time, the stacks have a limited number of electrochemical cells. Typically, the Applicant uses stacks with 25 electrochemical cells.

Before the functioning of an abovementioned electrochemical device, it is necessary to subject its stack to at least one "reduction" heat treatment step, in order to place the electrochemical cells in their reduced form, rather than in their oxidized form as they are initially.

This reduction step may be a thermomechanical cycle under gas: a reductive gas for the hydrogen electrode and air or a neutral gas for the oxygen electrode.

A particular heat treatment step was described in patent EP 2870650 B1.

The stacks employed to date generally use, in each of their stages, seals which must ensure the leaktightness between two different adjacent gas circulation compartments, i.e. an anode compartment and a cathode compartment. Advantageous seals were described in patent EP 3078071 B1. These seals have the particular feature of requiring thermal conditioning during which they become crushed.

Contact members, such as the layers described in patent application EP 2900846 A1 or nickel grids, also become crushed during the thermal conditioning and during the functioning of the electrochemical device, which ensures their correct installation. The members which serve as contact members in the hydrogen chamber also become crushed.

In other words, during the thermal conditioning step, a stack of an abovementioned electrochemical device comes crushed, typically by several centimetres. At the present time, given the relatively small number of stacked cells, the crushing takes place correctly.

Now, the Applicant is envisaging the production of stacks with a larger number of electrochemical cells, typically more than 25 cells.

However, the inventors have analysed that the expected movement during the tightening of the stack will lead to mechanical blocking problems of bracing type on the guide rods. This blocking will prevent correct thermal conditioning and, consequently, normal functioning of the electrochemical device.

There is thus a need to further improve stacked electrochemical devices forming an electrolysis reactor of SOEC type or a fuel cell of SOFC type, notably by increasing the number of electrochemical cells in the stack without this harming the electrochemical functioning of the devices.

DESCRIPTION OF THE INVENTION

To do this, the subject of the invention is firstly an electrochemical device, constituting an SOEC electrolysis or co-electrolysis reactor or an SOFC fuel cell, which is intended to function at high temperature, comprising a stack of at least two preassembled modules, in which each preassembled module comprises:
- a stack of electrochemical cells based on solid oxides of SOEC/SOFC type;
- a plurality of electrical and fluidic interconnectors, each consisting of a component made of gastight electrically conductive material to convey or collect the electrical current to the cells and to convey, collect and circulate gases on each electrode of each electrochemical cell; the interconnectors being individually arranged on either side of each of the electrochemical cells;
- two stiffening plates between which the stack is arranged;

in which
the stiffening plates, arranged in the stack of modules, form electrical and fluidic interconnectors between modules, whereas the two stiffening plates, arranged at the ends of the stack of modules, form electrical and fluidic connectors to convey or collect the electrical current from the electrochemical device to the exterior and to convey, collect and circulate the gases from the electrochemical device to the exterior;
in which
at least one electrical contact member is arranged between two adjacent modules with contact between their stiffening plates;
and in which
at least one seal is arranged between two adjacent modules to ensure the leaktightness around each gas inlet/outlet from one module to another.

A subject of the invention is also an electrochemical device intended to function at high temperature, comprising a stack of at least two preassembled modules, in which each preassembled module comprises:
- a stack of electrochemical cells based on solid oxides of SOEC/SOFC type;
- a plurality of electrical and fluidic interconnectors, each comprising a component made of gastight electrically conductive material to convey or collect the electrical current to the cells and to convey, collect and circulate gases on each electrode of each electrochemical cell; the interconnectors being individually arranged on either side of each of the electrochemical cells;
- two stiffening plates between which the stack is arranged;

in which
the stiffening plates, arranged in the stack of modules, form electrical and fluidic interconnectors between modules, whereas the two stiffening plates, arranged at the ends of the stack of modules, form electrical and fluidic connectors to convey or collect the electrical current between the electrochemical device and the exterior and to convey, collect and circulate the gases between the electrochemical device and the exterior;
in which
at least one electrical contact member is arranged between two adjacent modules with contact between their stiffening plates;
and in which
at least one seal is arranged between two adjacent modules to ensure the leaktightness around each gas inlet/outlet from one module to another.

According to a first advantageous embodiment variant, the electrical contact member(s) arranged between two adjacent modules with contact between their stiffening plates comprise(s) at least one layer of a conductive ceramic material.

According to this first variant, the conductive ceramic material is advantageously chosen from the group consisting of:
$La_{0.6}Sr_{0.4}Co_{0.8}Fe_{0.2}O_3$ (LSCF);
$La_{0.8}Sr_{0.2}Cu_{0.9}Fe_{0.1}O_{2.5}$ (LSCuF);
$La_{0.7}Sr_{0.3}CoO_3$ (LSC);
$Sm_{0.5}Sr_{0.5}CoO_3$ (SSC);
$SmBa_{0.5}Sr_{0.5}Co_2O_5$ (SBSC);
$GdSrCo_2O_5$ (GSC);
$La_{0.65}Sr_{0.3}MnO_3$ (LSM);
$LaBaCo_2O_5$ (LBC);
$YBaCo_2O_5$ (YBC);
$Nd_{1.8}Ce_{0.2}CuO_4$ (NCC);
$La_{0.8}Sr_{0.2}Co_{0.3}Mn_{0.1}Fe_{0.6}O_3$ (LSCMF);
$La_{0.98}Ni_{0.6}Fe_{0.4}O_3$ (LNF);
$LaL_2Sr_{0.8}NiO_4$ (LSN);
$La_{0.7}Sr_{0.3}FeO_3$ (LSF);
$La_2Ni_{0.6}Cu_{0.4}O_4$ (LNC).

More advantageously, the conductive ceramic material is chosen from the group consisting of LSM, LSC, LNF and LSCF.

Preferably, the layer of conductive ceramic material is hollowed on at least a part of its thickness. The hollowing may consist of grooves, holes or any other form. Hollowing, in particular grooving the contact layer, makes it possible for the same crushing force to increase the stress and thus to further crush the layer and thereby better correct the surface defects. In other words, by grooving a contact layer, its crushability is improved.

According to a second variant, the electrical contact member(s) arranged between two adjacent modules with contact between their stiffening plates comprise(s) at least one gold grid or at least one gold bead obtained by deposition of a paste. A gold grid may have a surface area of 100 $cm^2$ or 200 $cm^2$ with a number of grid cells of from 100 to 3600 grid cells/$cm^2$. A bead made by depositing a gold paste may have a thickness of the order of several hundred microns. A nickel grid may also be envisaged. Care will be taken in this case to produce sealing around the grid to prevent its oxidation. According to an advantageous embodiment variant, the at least one seal arranged between two adjacent modules consists of a pierced mica sheet facing each gas inlet/outlet from one module to another, where appropriate coated with a glass or vitroceramic bead around each gas inlet/outlet. Use may also be made of a simple mica without glass or vitroceramic, which reduces the sealing performance but makes the module easier to replace if necessary.

Alternatively, the at least one seal arranged between two adjacent modules consists of a glass or vitroceramic bead around each gas inlet/outlet. Vitroceramic has the advantage of being a crystalline structure which increases the sealing performance.

Advantageously, the thickness of each of the stiffening plates is between 1 and 10 mm.

According to an advantageous embodiment, the device comprises two additional end plates, known as terminal plates, which are different from the stiffening plates between which the stack of modules is arranged. Arranging terminal plates in addition to the stiffening plates at the ends of the stack of modules may allow a simpler fluidic junction with the surrounding fluid management system and notably due to the changes in dimensions between the fluidic distributions of the stack of modules and of the fluid management system.

Preferably, the thickness of each of the terminal plates is greater than 5 mm.

According to another advantageous embodiment, the device comprises at least one electrical connection rod attached to each of the two stiffening plates or, where appropriate, to each of the two terminal plates, arranged at the ends of the stack of modules.

Preferably, each of the electrical connection rods is screwed into a tapping on the edge of one of the two stiffening plates or, where appropriate, of one of the two terminal plates.

More preferably, four connecting rods may be provided, individually attached to the corners of each of the two stiffening plates or, where appropriate, to each of the two terminal plates, arranged at the ends of the stack of modules. This makes it possible to improve the homogeneity of the surface distribution of the electrical current and thereby to have thinner plates.

A subject of the invention is also a process for producing an electrochemical device, forming an SOEC electrolysis or co-electrolysis reactor or an SOFC fuel cell, intended to function at high temperature, comprising the following steps:
a) producing at least two modules, each module comprising:
   a stack of electrochemical cells based on solid oxides of SOEC/SOFC type;
   a plurality of electrical and fluidic interconnectors, each comprising a component made of gastight electrically conductive material to convey or collect the electrical current to the cells and to convey, collect and circulate gases on each electrode of each electrochemical cell; the interconnectors being arranged on either side of each of the electrochemical cells;
   two stiffening plates between which the stack is arranged;
b) applying a force for tightening each module by a bolt system between its two stiffening plates so as to obtain a preassembly of each module enabling it to be transported;
c) stacking the modules preassembled according to step b) on each other, with intercalation, between two adjacent modules with contact between their stiffening plates, of at least one electrical contact member and of at least one seal to ensure sealing around each gas inlet/outlet from one module to another;
d) applying a force for tightening the stack of modules by means of a tightening system, independent of the bolt systems of the modules, between the two end stiffening plates so as to obtain an assembly;
e) removing the bolt systems from the assembly while maintaining the independent tightening;
f) applying a thermomechanical treatment to the assembly so as to finalize at least the placing of the electrical contact members and of the seals between stiffening plates and thus to obtain the final assembly;
the process comprising a step of reducing all the electrochemical cells.

According to an advantageous embodiment variant, step a) comprises a step a1) of applying a thermomechanical treatment to each module produced, so as to finalize at least the placing of electrical contact members and seals in each module.

The modules must be reduced. The step of reduction of the electrochemical cells may be performed during step a1) for each module or during step f) for the assembly of modules. The reduction may thus be performed during the initial placing at temperature of each of the modules, or subsequently once the stack of modules has been produced.

The reduction of the electrochemical cells may take place at and above 650° C. or advantageously at 800° C. over a period from one hour to several days as a function of the hydrogen flow rates delivered.

A certain volume of hydrogen is necessary to completely reduce an electrochemical cell, and it is preferably necessary to send small amounts of hydrogen at a time to avoid an excessively abrupt reduction so as not to risk deforming or even breaking the cells. Once reduced, the cells and thus the electrochemical device can function normally, i.e. perform an HTE electrolysis reaction or produce electricity.

According to another advantageous variant, when the step of reduction of the electrochemical cells is performed during step a1) for each module, a step a2) of measuring the total electrical voltage of each module is advantageously performed on conclusion of said step.

According to another advantageous variant, the process comprises a step a3) of testing the leaktightness of each module.

Thus, the invention consists essentially of an electrochemical device which is formed by assembly by stacking preassembled modules, each of these modules being produced as a usual stack of electrochemical cells.

The manufacture of preassembled modules makes it possible to produce electrochemical devices with a large number of electrochemical cells, without the bracing problems present and excessive crushing courses that are encountered in the cell stacks according to the prior art, i.e. in a single block.

Typically, if the maximum number of electrochemical cells that may be stacked before the bracing problems appear is 25, the invention makes it possible to produce preassembled modules comprising 25 cells, and thus an overall stack of modules comprising a multiple of 25 cells without any risk of bracing problems arising.

Finally, the assembly of modules allows normal functioning of the electrochemical device.

The contact members and seals between stiffening plates of two adjacent modules make it possible to obtain good circulation of the gases and to ensure good sealing, and also to ensure a good electrical contact.

In addition, manufacturing in the form of modules enables easy replacement of one of them if it is defective.

Furthermore, a preassembled stack of modules according to the invention makes it possible to propose an electrochemical device in which the voltage level, the total power or the size can be readily modulated. It is thus possible to provide electrical voltages of between 10 and 1000 V by means of a single electrochemical device, and to do so by modulating the total number of cells per module and the number of stacked modules.

Other advantages and characteristics will emerge more clearly on reading the detailed description, which is given for non-limiting illustrative purposes with reference to the following figures.

DETAILED DESCRIPTION

Throughout the present patent application, the terms "lower", "upper", "above", "below", "inner", "outer", "internal" and "external" are to be understood with reference to an electrochemical device according to the invention in functioning configuration, i.e. the modules being stacked vertically.

It is also pointed out that the electrolysers or fuel cells described are of solid oxide type (SOEC, solid oxide electrolyte cell, or SOFC, solid oxide fuel cell) functioning at high temperature. Thus, all the constituents (anode/electrolyte/cathode) of an electrolysis cell or of a fuel cell are ceramic. The high operating temperature of an electrolyser (electrolysis reactor) or of a fuel cell is typically between 600° C. and 1000° C. Typically, the characteristics of an SOEC electrolysis cell that is suitable for use in the invention, of the cathode support type (CSC), may be those indicated as follows in Table 1 below.

TABLE 11

| Electrolysis cell | Unit | Value |
|---|---|---|
| Cathode | | |
| Constituent material | | Ni-YSZ |
| Thickness | μm | 400 |
| Thermal conductivity | $W\ m^{-1}\ K^{-1}$ | 13.1 |
| Electrical conductivity | $\Omega^{-1}\ m^{-1}$ | $10^5$ |
| Porosity | | 0.37 |
| Permeability | $m^2$ | $10^{-13}$ |
| Tortuosity | | 4 |
| Current density | $A.m^{-2}$ | 5300 |
| Anode | | |
| Constituent material | | LSM, LSC |
| Thickness | μm | between 10 and 50 |
| Thermal conductivity | $W\ m^{-1}\ K^{-1}$ | 9.6 |
| Electrical conductivity | $\Omega^{-1}\ m^{-1}$ | $1 \times 10^4$ |
| Porosity | | 0.37 |
| Permeability | $m^2$ | $10^{-13}$ |
| Tortuosity | | 4 |
| Current density | $A.m^{-2}$ | 2000 |
| Electrolyte | | |
| Constituent material | | YSZ |
| Thickness | μm | <10 |
| Resistivity | $\Omega\ m$ | 0.42 |

Figure 1:
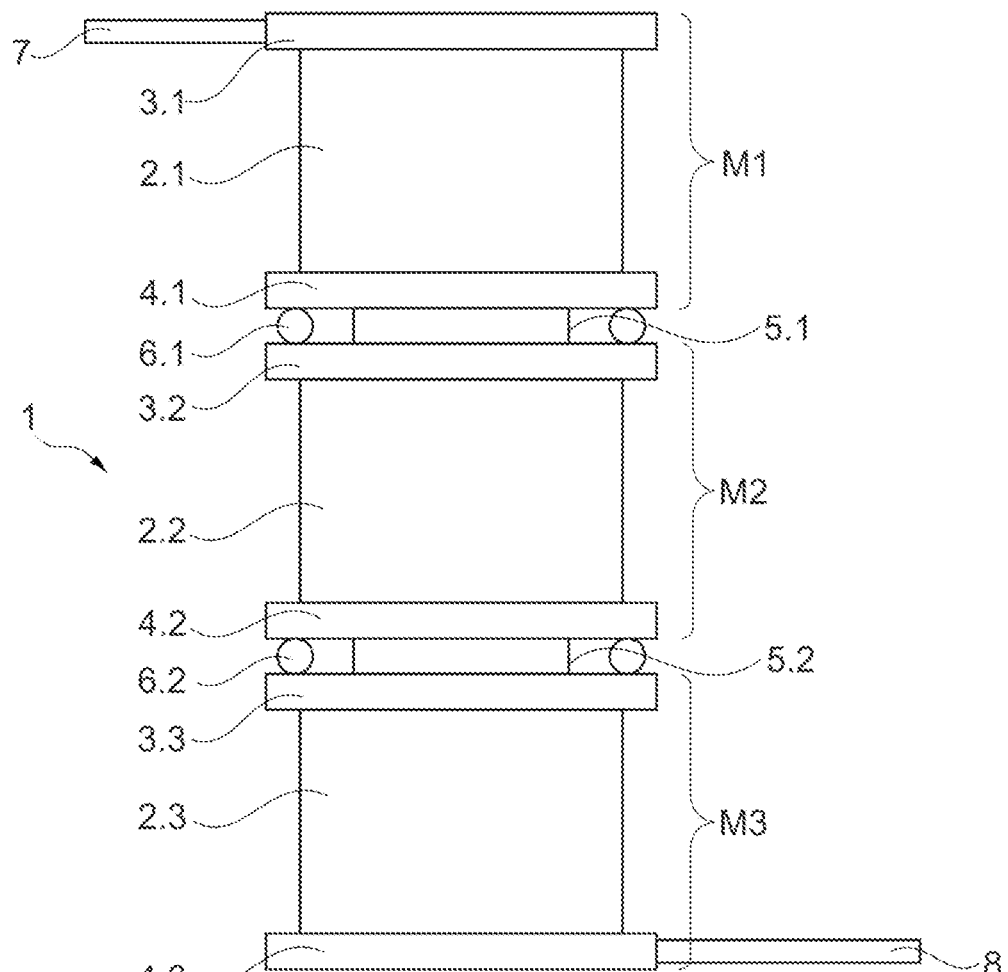
FIG. 1 is a schematic side view of an example of an electrochemical device with preassembled modules according to the invention.

FIG. 1 shows an electrochemical device 1 according to the invention which can function reversibly as a high-temperature electrolyser or as an SOFC fuel cell.

This device 1 comprises a stack of three preassembled modules M1, M2, M3.

Each of the modules M1, M2, M3 comprises a stack 2.1, 2.2, 2.3, respectively, of electrochemical cells based on solid oxides of SOEC/SOFC type.

Within each stack 2.1, 2.2, 2.3, a plurality of electrical and fluidic interconnectors, not shown, is individually arranged on either side of each of the electrochemical cells. Each interconnector consists of a component made of a gastight electrically conductive material to convey or collect the electrical current to the cells and to convey, collect and circulate gases on each electrode of each electrochemical cell.

Similarly, within each stack 2.1, 2.2, 2.3, a plurality of contact members and of seals around each gas inlet/outlet is individually arranged on each electrode of the electrochemical cells.

In other words, each module M1, M2, M3 comprises a stack of cells with individual intercalation of interconnectors, contact members and seals as done according to the prior art for a full electrochemical device.

Each module M1, M2, M3 also comprises two stiffening plates 3.1, 4.1; 3.2, 4.2 and 3.3, 4.3, respectively, between which the stack of cells 2.1, 2.2, 2.3 is arranged.

In the stack of modules, the stiffening plates 4.1, 3.2, 4.2, 3.3 within the stack of modules form electrical and fluidic interconnectors between modules.

The two stiffening plates 3.1, 4.3, arranged at the ends of the stack of modules, form electrical and fluidic connectors to convey or collect the electrical current from the electrochemical device to the exterior and to convey, collect and circulate the gases from the electrochemical device to the exterior.

An electrical contact member 5.1 is arranged between two adjacent modules M1, M2 with contact between their stiffening plates 4.1 and 3.2.

A seal 6.1 is arranged between two adjacent modules M1, M2 to ensure the leaktightness around each gas inlet/outlet from one module M1 to the other M2.

An electrical contact member 5.2 is arranged between two adjacent modules M2, M3 with contact between their stiffening plates 4.2 and 3.3.

A seal 6.2 is arranged between two adjacent modules M2, M3 to ensure the leaktightness around each gas inlet/outlet from one module M2 to the other M3.

Two electrical connection rods 7, 8, usually referred to as current pipes, are each screwed into a tapping on the edge of one of the two stiffening plates 3.1, 4.3 which are at the ends of the stack of modules. Thus, the electrical current may be conveyed via one of the pipes 7 and emerge from the stack of modules via the other pipe 8. The current pipes 7, 8 may each advantageously consist of a rod made of a first metallic material and of a sheath entirely covering and welded to the rod and made of a second metallic material, which is corrosion-resistant, with an electrical resistivity lower than the electrical resistivity of the first metallic material. The rod and the sheath are preferably welded together by hot isostatic pressing.

For example, the rod is made of copper and is covered with a sheath made of stainless steel.

Thus, the electrochemical device 1 according to the invention is a superposition of preassembled modules M1 to M3 through which circulate the electrochemical reaction gases and the electrical currents, each of the modules M1 to M3 comprising a stack of electrochemical cells alternating with interconnectors, contact members and seals as in the prior art.

A process for producing an electrochemical device 1 according to the invention is now described with reference to FIGS. 2 to 6.

Figure 2:
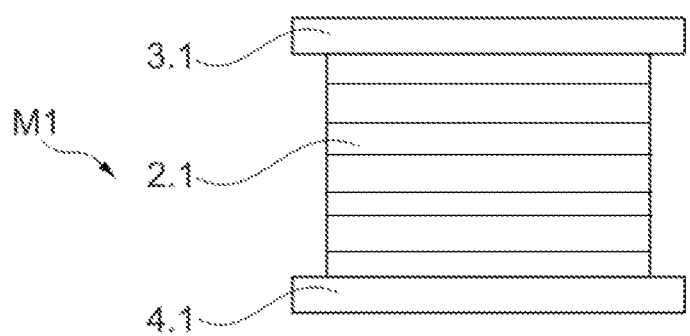
FIG. 2 is a schematic side view of an example of a module containing a stack of electrochemical cells in accordance with the invention.

Step a): each of the modules M1 to M3 is produced with a stack of cells 2.1, 2.2, 2.3 between two stiffening plates 3.1, 3.2, 3.3 and 4.1, 4.2, 4.3. An example of a module M1 produced is shown in FIG. 2.

Each of the stiffening plates 3.1, 3.2, 3.3 preferably consists of a thick metal plate, and, on one of its faces on which the gases are to circulate, two thin metal sheets. In other words, it is the thickness of the metal plate which provides the stiffening, the thin sheets allowing the circulation of the gases and the electrical continuity.

The thick metal plate is preferably made of ferritic steel, notably of the type such as Crofer®, AISI 441 and/or AISI 430. The thickness of the thick metal plate is preferably greater than 1 mm. The thickness of each thin sheet is preferably between 0.1 and 0.5 mm, preferably equal to 0.2 mm. The total thickness of a stiffening plate 3.1, 3.2, 3.3 is preferably between 1 and 10 mm.

A thermomechanical treatment is applied to each module produced, so as to finalize at least the placing of electrical contact members and seals in each module. This thermomechanical treatment may also comprise the reduction of the electrochemical cells.

The temperatures are determined by the temperatures required for the placing of the seals typically made of glass or vitroceramic, namely 920° C. for 1 hour. The temperature rise may take place for given module at up to 10° C./minute.

The reduction of the electrochemical cells may take place at and above 650° C. or advantageously at 800° C. over a period from one hour to several days as a function of the hydrogen flow rates delivered.

The total electrical voltage of each module is then measured, which makes it possible to validate the correct electrical functioning of each module.

The heating of the thermomechanical treatment is stopped and the temperature naturally returns to 20° C. It is possible to cool more rapidly by delivering cold air to increase the cooling rates.

A test of leaktightness of each module is then performed.

Figure 3:
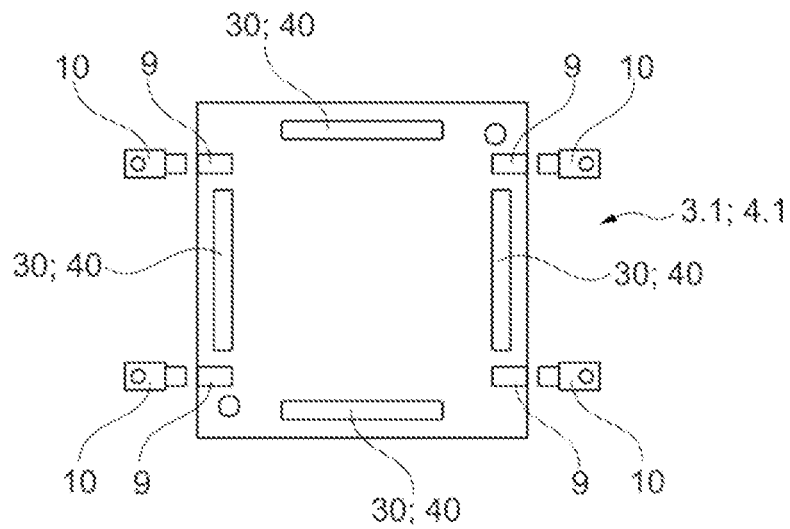
FIG. 3 is a schematic top view of an example of a stiffening plate with its piercings for the circulation of the gases and its means for attaching a tightening system with threaded bolts for the transportation and handling of a preassembled module in accordance with the invention.

Step b): As illustrated in FIG. 3 in relation with a stiffening plate 3.1 or 4.1, each of the stiffening plates of the modules M1 to M3 is pierced on its edge and at its four corners with a tapping 9 into which is screwed a mounting bracket 10. Also, each stiffening plate is pierced with through-holes 30 or 40 for the passage of the gases.

Figure 4:
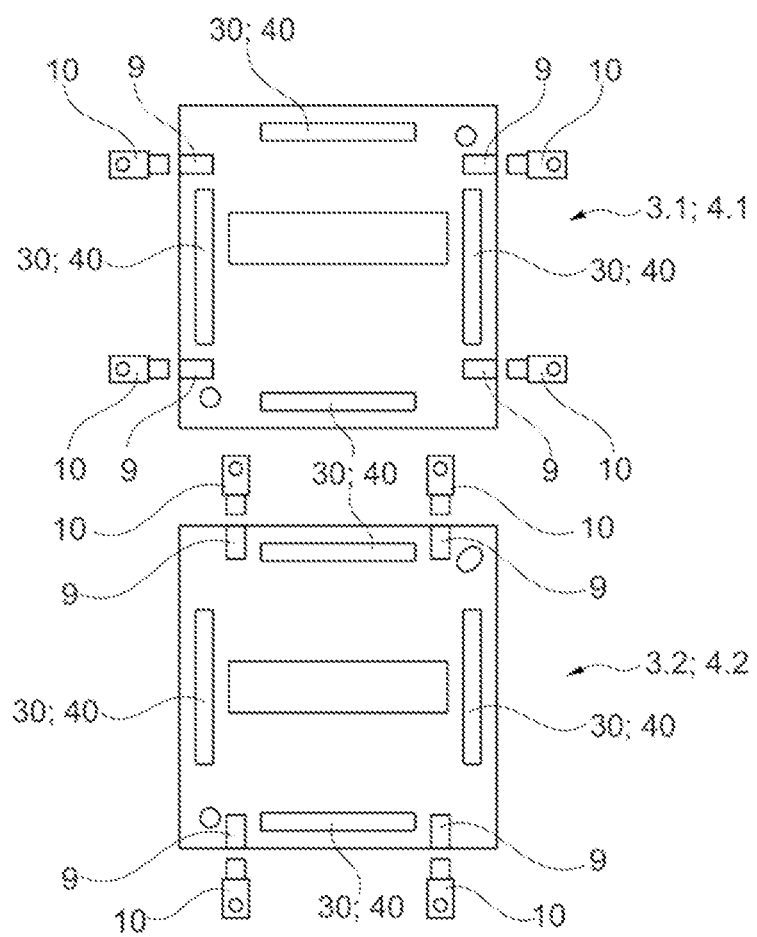
FIG. 4 is a schematic top view of two stiffening plates with their means for attaching a tightening system with threaded bolts, which are intended to equip two different modules to be preassembled and to be stacked one on the other.

At room temperature, a system of tightening bolts is installed, each consisting of a threaded rod 11 and of nuts 12 at the four corners of each module, as illustrated in FIG. 4 with the module M1. Each of the rods 11 is inserted into the hole of a mounting bracket 10.

It is pointed out that the positioning of the tappings 9 and of the mounting brackets 10 that are screwed is offset from one module M1 to another M2 which will be stacked on the module M1. Specifically, as explained hereinbelow, since the bolting system of each module M1 to M3 needs to be removed thereafter, there must be no physical interference during the removal of the threaded rods 11.

An advantageous example of offset positioning is shown in FIG. 4 in reference to two stiffening plates 3.1 or 4.1 and 3.2 or 4.2 belonging to two different modules M1, M2 which will be stacked one on the other thereafter. It is seen that the tappings 9 and mounting brackets 10 are offset from one side edge to another, i.e. by 90° from one stiffening plate 3.1 or 4.1 to the other 3.2 or 4.2 which will be stacked.

Figure 5:
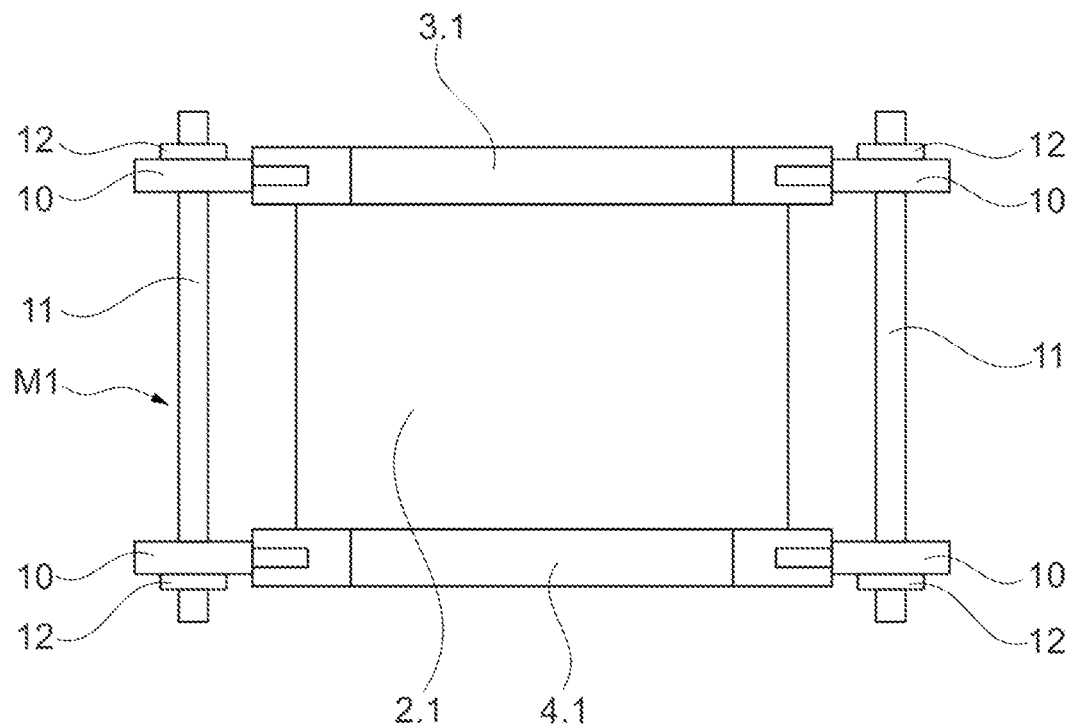
FIG. 5 is a schematic view in longitudinal cross section of an example of a module containing a stack of electrochemical cells in accordance with the invention, equipped with its tightening system with bolts.

For each module M1 to M3, a tightening force is then applied by the bolt system 10, 11, 12 between its two stiffening plates so as to obtain a preassembly of each module, allowing it to be transported (FIG. 5).

Step c): the modules M1 to M3 preassembled according to step b) are then transported and subsequently stacked on each other, with intercalation between two adjacent modules with contact between their stiffening plates 3.2 and 4.1 or 4.2 and 3.3, of the electrical contact member 5.1 or 5.2, respectively, and of the seal 6.1 or 6.2, respectively.

More precisely, for the positioning of the modules, the placing of the contact members 5.1 or 5.2 and to make a seal 6.1 or 6.2, the following is performed:
 a mica sheet is cut to make the gas inlets/outlets and the central positioning of a contact member, and the zones of these inlets to be made leaktight are marked;
 glass slip beads are placed above the marked zones to be made leaktight;
 the mica sheet coated with the slip beads is positioned on the lower module;
 the contact member is positioned in its predetermined central position;
 the upper module is positioned.

Step d): a force for tightening the stack of modules M1 to M3 is then applied by means of a tightening system, independent of the bolt systems of the modules, between the two end stiffening plates 3.1 and 4.3 so as to obtain an assembly.

Step e): Once the assembly has been made with loading of the entire stack according to step d), the bolt systems are removed. The positioning offset of the tappings 9 and mounting brackets 10 from one module M1 or M2 to another adjacent one in the stack M2 or M3 makes it possible to easily release the threaded rods 11 of the bolting systems.

Step f): the assembly is then subjected to a thermomechanical treatment so as to finalize at least the placing of the electrical contact members 5.1 and 5.2 and the seals 6.1 and 6.2 between the stiffening plates. The formation of the seals may be performed under a neutral gas which has the function of preventing oxidation. This gas may be nitrogen, argon, helium or neon.

The final assembly is thus obtained.

One of the advantages of an electrochemical device 1 by stacking of preassembled modules M1 to M3 as has just been described is that it is possible to perform easy replacement of a defective module without the need to replace the whole device.

To do this, the following may be performed:
 stopping the electrochemical functioning with electrical deconnection and return to room temperature of the device 1 under tightening load;
 for each module M1 to M3, reinsertion of its system of tightening by bolts 10, 11, 12;

removal of the overall tightening system of the device, independent of the bolt systems;

removal of the defective module and replacement thereof with a new module;

returning under load by the overall tightening system of the device;

removal of all the systems for tightening by bolts 10, 11, 12;

application of a thermomechanical treatment to reposition the contact members 5.1; 5.2 and the seals 6.1; 6.2.

Figure 6:
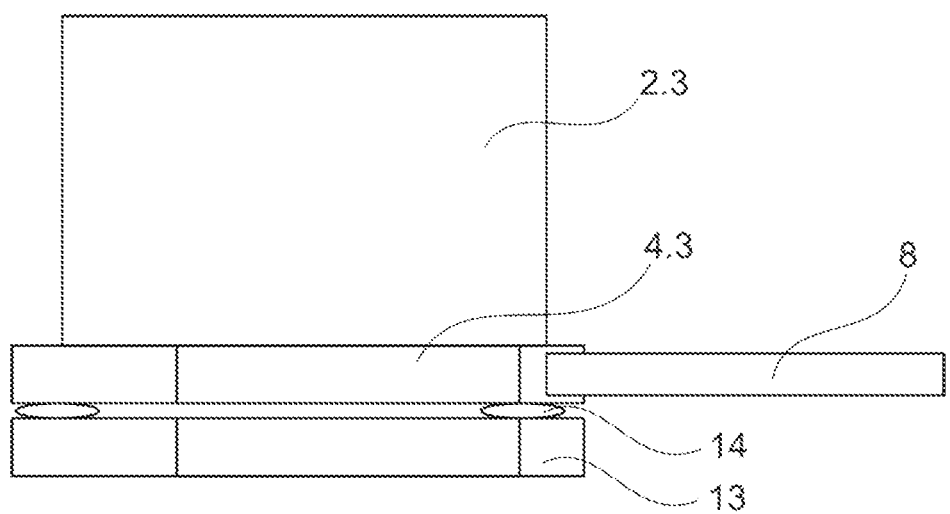
FIG. 6 is a partial schematic side view of a lower part of an electrochemical device according to a first embodiment variant.
Figure 7:
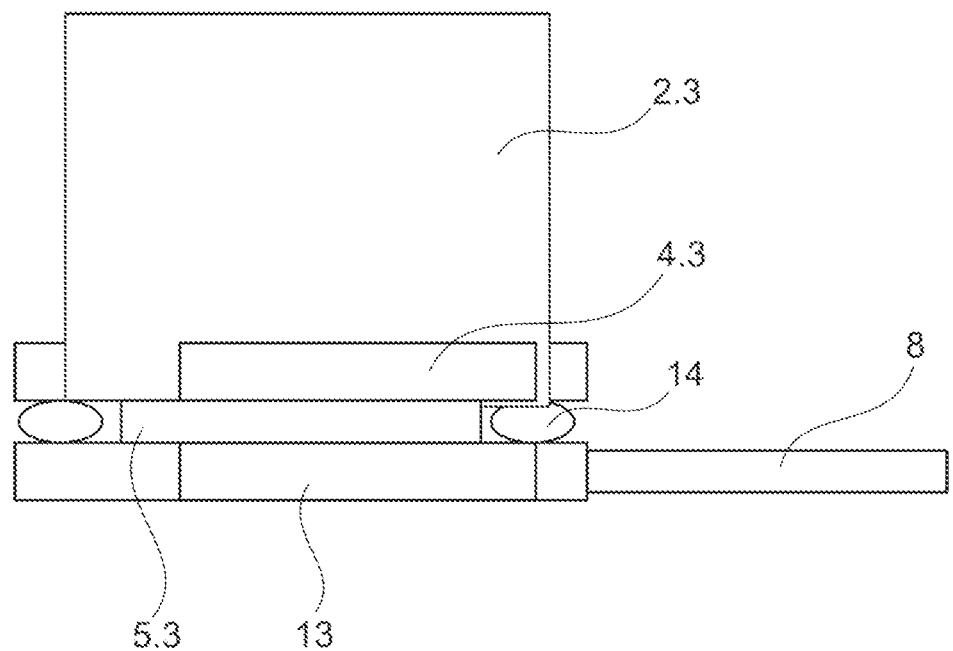
FIG. 7 is a partial schematic side view of a lower part of an electrochemical device according to a first embodiment variant.

As illustrated in FIGS. 6 and 7, it may be advantageous to replace terminal plates 13 at the ends of the stack of modules M1 to M3 in addition to the end stiffening plates 3.1; 4.3 of the modules. This may allow a simpler fluidic junction with the surrounding fluid management system.

The current pipe 8 is preferably screwed into the terminal plate 13 which may be thicker than a stiffening plate 13 (FIG. 7). An additional contact member 5.3 between the terminal plate 13 and the stiffening plate 4.3 is envisaged in this configuration.

Irrespective of the configuration with terminal plates (FIG. 6 or 7), an additional seal 14 is also envisaged between the terminal plate 13 and the stiffening plate 4.3.

The invention is not limited to the examples that have just been described; characteristics of the illustrated examples may notably be combined together within variants not illustrated.

Other variants and improvements may be envisaged without, however, departing from the scope of the invention.

Whereas, in the illustrated examples, an electrochemical device is a stack of three modules M1 to M3 containing a stack of cells, a stack of two modules or more than three modules may be envisaged, only the number of electrochemical cells stacked within each module being limited so as not to generate blocking by bracing during their tightening.

Instead of a system of tightening and transportation with a tapping in the edge of the stiffening plates as described with reference to FIGS. 3 and 4, an alternative would be to apply a system as described in patent FR 3045215 B1: each stiffening plate should have a larger surface with holes passing through in the peripheral part to pass the bolt rods through.

More generally, mechanical systems other than the bolts and mounting brackets used in the illustrated example may be envisaged for the force take-up.

Whereas, in the example of the production process, the step of reduction of the electrochemical cells takes place for each module during their manufacture at high temperature, it may also be envisaged to perform it during step f) for the assembly of the modules.

The tappings 9 for the attachment of the systems of tightening by bolts 10, 11, 12 may advantageously serve to attach the current pipes 7, 8. Thus, by using the same tapped positions, a saving in compactness is made. The attachment of the current pipes 7, 8 is advantageously performed with the same mounting brackets 10. Preferably, the tappings 9 are then covered with a gold paste to ensure good electrical contact.

To produce the seals 6.1, 6.1, they may be made only with mica, i.e. without any layer of glass or vitroceramic as in the illustrated example. This variant may facilitate the replacement of a defective module if need be, since glass or vitroceramic reacts with its support.

The invention claimed is:

1. An electrochemical device configured to function at high temperature, the device comprising:

a stack comprising a first and a second preassembled module, in which each preassembled module is obtained by tightening applied by a bolt system and comprises:

a stack of electrochemical cells comprising SOEC/SOFC solid oxides;

a plurality of electrical and fluidic interconnectors, each interconnector comprising a component comprising gastight electrically conductive material to convey or collect the electrical current to the stack of electrochemical cells and to convey, collect, and circulate gases on each electrode of each electrochemical cell, the interconnectors being individually arranged on either side of each of the electrochemical cells;

a first and a second stiffening plate between which the stack is arranged, wherein the first and second stiffening plates, arranged in the stack of modules, form electrical and fluidic interconnectors between modules, the first and second stiffening plate, arranged at the ends of the stack of modules, forming electrical and fluidic connectors to convey or collect the electrical current between the electrochemical device and the exterior and to convey, collect, and circulate the gases between the electrochemical device and the exterior, wherein at least one electrical contact member is arranged between two adjacent modules with contact between their stiffening plates, and wherein at least one seal is arranged between two adjacent modules to ensure the leaktightness around each gas inlet/outlet from one module to another.

2. The device of claim 1, wherein the at least one electrical contact member is arranged between two adjacent modules with contact between their stiffening plates comprising a layer of a conductive ceramic material.

3. The device of claim 2, wherein the conductive ceramic material is selected from the group consisting of:

$La_{0.6}Sr_{0.4}Co_{0.8}Fe_{0.2}O_3$ (LSCF);
$La_{0.8}Sr_{0.2}Cu_{0.9}Fe_{0.1}O_{2.5}$ (LSCuF);
$La_{0.7}Sr_{0.3}CoO_3$ (LSC);
$Sm_{0.5}Sr_{0.5}CoO_3$ (SSC);
$SmBa_{0.5}Sr_{0.5}Co_2O_5$ (SBSC);
$GdSrCo_2O_5$ (GSC);
$La_{0.65}Sr_{0.3}MnO_3$ (LSM);
$LaBaCo_2O_5$ (LBC);
$YBaCo_2O_5$ (YBC);
$Nd_{1.8}Ce_{0.2}CuO_4$ (NCC);
$La_{0.8}Sr_{0.2}Co_{0.3}Mn_{0.1}Fe_{0.6}O_3$ (LSCMF);
$La_{0.98}Ni_{0.6}Fe_{0.4}O_3$ (LNF);
$La_{1.2}Sr_{0.8}NiO_4$ (LSN);
$La_{0.7}Sr_{0.3}FeO_3$ (LSF); and
$La_2Ni_{0.6}Cu_{0.4}O_4$ (LNC).

4. The device of claim 3, wherein the conductive ceramic material is selected from the group consisting of LSM, LSC, LNF, and LSCF.

5. The device of claim 2, wherein the layer of conductive ceramic material is hollowed on at least a part of its thickness.

6. The device of claim 1, wherein the at least one electrical contact member is arranged between two adjacent modules with contact between their stiffening plates comprising a gold grid or gold bead obtained by deposition of a paste.

7. The device of claim 1, wherein the at least one seal arranged between two adjacent modules consists of a pierced mica sheet facing each gas inlet/outlet from one module to another, optionally coated with a glass or vitroceramic bead around each gas inlet/outlet.

8. The device of claim 1, wherein the at least one seal arranged between two adjacent modules consists of a glass or vitroceramic bead around each gas inlet/outlet.

9. The device of claim 1, wherein a thickness of each of the stiffening plates is in a range of from 1 to 10 mm.

10. The device of claim 1, comprising a first and a second additional end plate, known as terminal plates, which differ from the stiffening plates between which the stack of modules is arranged.

11. The device of claim 10, wherein a thickness of each of the terminal plates is greater than 5 mm.

12. The device of claim 1, comprising an electrical connection rod attached to each of the two stiffening plates or to each of a first and second terminal plate, arranged at the ends of the stack of modules.

13. The device of claim 12, wherein each of the electrical connection rods is screwed into a tapping on the edge of one of the two stiffening plates or of one of two terminal plates.

14. The device of claim 12, comprising a first, second, third, and fourth connecting rod individually attached to corners of each of the two stiffening plates or to each of a first and second terminal plate, arranged at ends of the stack of modules.

15. The device of claim 1, wherein the at least one seal arranged between two adjacent modules comprises a pierced mica sheet facing each gas inlet/outlet from one module to another, optionally coated with a glass or vitroceramic bead around each gas inlet/outlet.

* * * * *